US012045492B2

(12) United States Patent
Gan et al.

(10) Patent No.: US 12,045,492 B2
(45) Date of Patent: Jul. 23, 2024

(54) DATA STORAGE METHOD, APPARATUS, DEVICE AND STORAGE MEDIUM USING DISTRIBUTED HOSTS FOR USER IDENTIFICATIONS

(71) Applicant: CHINA UNIONPAY CO., LTD., Shanghai (CN)

(72) Inventors: Mingming Gan, Shanghai (CN); Jijing Hu, Shanghai (CN); Jie Li, Shanghai (CN); Yanming Yang, Shanghai (CN); Hai Zhao, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/013,152

(22) PCT Filed: Sep. 18, 2021

(86) PCT No.: PCT/CN2021/119378
§ 371 (c)(1),
(2) Date: Dec. 27, 2022

(87) PCT Pub. No.: WO2022/183713
PCT Pub. Date: Sep. 9, 2022

(65) Prior Publication Data
US 2023/0244405 A1 Aug. 3, 2023

(30) Foreign Application Priority Data

Mar. 2, 2021 (CN) .......................... 202110230060.2

(51) Int. Cl.
*G06F 3/06* (2006.01)
(52) U.S. Cl.
CPC .......... *G06F 3/0652* (2013.01); *G06F 3/0607* (2013.01); *G06F 3/067* (2013.01)

(58) Field of Classification Search
CPC ...... G06F 3/0652; G06F 3/0607; G06F 3/067; G06F 3/0637; G06F 21/78; G06F 21/64
See application file for complete search history.

(56) References Cited

U.S. PATENT DOCUMENTS 10,078,754 B1 * 9/2018 Brandwine ............. G06F 21/78
10,620,866 B1 * 4/2020 Kumar .................. G06F 16/288
(Continued)

FOREIGN PATENT DOCUMENTS

| CN | 105491149 A | 4/2016 |
| CN | 106528793 A | 3/2017 |

(Continued)

OTHER PUBLICATIONS

CNIPA; Office Action for Chinese Patent Application No. 202110230060.2 dated Jul. 8, 2023, 8 pages.
(Continued)

*Primary Examiner* — Christopher D Birkhimer
(74) *Attorney, Agent, or Firm* — K&L Gates LLP

(57) ABSTRACT

This application provides a data storage method which is applied to a data storage device and includes: acquiring a first user identification and first user data of a first user; determining, from at least two preset distributed hosts in different areas, a first identification distributed host corresponding to the first user identification and a first data distributed host corresponding to the first user data; sending the first user identification to the first identification distributed host, so that the first identification distributed host stores the first user identification, and generates and stores a first identity identification corresponding to the first user identification; receiving the first identity identification; and sending the first identity identification and the first user data to the first data distributed host, so that the first data distributed host stores them in an associated manner.

20 Claims, 3 Drawing Sheets

(56) References Cited

U.S. PATENT DOCUMENTS

| | | | |
|---|---|---|---|
| 2003/0046589 A1* | 3/2003 | Gregg | H04L 63/0853 726/5 |
| 2004/0098595 A1* | 5/2004 | Aupperle | H04L 63/0815 713/185 |
| 2006/0005074 A1* | 1/2006 | Yanai | G06F 11/2066 714/6.32 |
| 2008/0066168 A1* | 3/2008 | Gregg | G06F 21/335 726/7 |
| 2011/0173407 A1* | 7/2011 | Topham | G06F 3/0607 711/163 |
| 2013/0111034 A1* | 5/2013 | Upadhya | G06F 3/0605 709/226 |
| 2016/0291897 A1* | 10/2016 | Bae | G06F 3/0637 |
| 2017/0041296 A1* | 2/2017 | Ford | G06F 21/64 |
| 2017/0097942 A1 | 4/2017 | Couckuyt et al. | |
| 2017/0109100 A1* | 4/2017 | Crawford | G06F 3/067 |
| 2018/0088846 A1* | 3/2018 | Secatch | G06F 3/067 |
| 2018/0121033 A1 | 5/2018 | Normandin et al. | |
| 2018/0234239 A1 | 8/2018 | Hasegawa et al. | |
| 2019/0222649 A1* | 7/2019 | Cheng | H04L 69/16 |
| 2020/0050686 A1* | 2/2020 | Kamalapuram | H04L 67/10 |
| 2020/0341658 A1* | 10/2020 | Hebsur | G06F 3/0673 |

FOREIGN PATENT DOCUMENTS

| | | |
|---|---|---|
| CN | 106980647 A | 7/2017 |
| CN | 108920099 A | 11/2018 |
| CN | 111159134 A | 5/2020 |
| CN | 112395469 A | 2/2021 |
| CN | 112966312 A | 6/2021 |
| TW | 201443674 A | 11/2014 |

OTHER PUBLICATIONS

The International Search Report issued on Dec. 16, 2021 for International PCT Application No. PCT/CN2021/119378.

The First Office Action issued on Sep. 29, 2022 for Taiwanese Patent Application No. 110142616.

* cited by examiner

DATA STORAGE METHOD, APPARATUS, DEVICE AND STORAGE MEDIUM USING DISTRIBUTED HOSTS FOR USER IDENTIFICATIONS

CROSS-REFERENCE TO RELATED APPLICATIONS

This application is a National Stage of International Application No. PCT/CN2021/119378, filed on Sep. 18, 2021, which claims priority to Chinese Patent Application No. 202110230060.2, filed on Mar. 2, 2021 and entitled "Data storage method, apparatus, device and storage medium", both of which are incorporated herein by reference for all purpose.

TECHNICAL FIELD

The present application relates to the technical field of data storage, and in particular to a data storage method, a data storage apparatus, a data storage device and a storage medium.

BACKGROUND

Currently, user data storage schemes typically store user data for all areas centrally to a core distributed host at a location, or store user data for all areas synchronously to a distributed host in each area. It can be seen that in the above-mentioned user data storage schemes, user data for a plurality of areas are stored together, and thus leakage of a full amount of user data tends to occur, which has a low security.

SUMMARY

Embodiments of the present application provide a data storage method, an apparatus, a device and a storage medium.

In a first aspect, embodiments of the present application provide a data storage method applied to a data storage device, including: acquiring a first user identification and first user data of a first user; determining, from at least two preset distributed hosts, a first identification distributed host corresponding to the first user identification and a first data distributed host corresponding to the first user data, wherein the first identification distributed host is the same as or different from the first data distributed host, and the at least two distributed hosts are located in different areas; sending the first user identification to the first identification distributed host, so that the first identification distributed host stores the first user identification, and generates and stores a first identity identification corresponding to the first user identification; receiving the first identity identification sent by the first identification distributed host; and sending the first identity identification and the first user data to the first data distributed host, so that the first data distributed host stores the first identity identification and the first user data in an associated manner.

In a second aspect, embodiments of the present application provide a data storage apparatus applied to a data storage device, including: an acquiring module configured to acquire a first user identification and first user data of a first user; a determining module configured to determine, from at least two preset distributed hosts, a first identification distributed host corresponding to the first user identification and a first data distributed host corresponding to the first user data, wherein the first identification distributed host is the same as or different from the first data distributed host, and the at least two distributed hosts are located in different areas; a sending module configured to send the first user identification to the first identification distributed host, so that the first identification distributed host stores the first user identification, and generates and stores a first identity identification corresponding to the first user identification; and a receiving module configured to receive the first identity identification sent by the first identification distributed host; wherein the sending module is further configured to send the first identity identification and the first user data to the first data distributed host, so that the first data distributed host stores the first identity identification and the first user data in an associated manner.

In a third aspect, embodiments of the present application provides a data storage device, including a processor and a memory storing computer program instructions that when executed by the processor, implement the data storage method in the first aspect.

In a fourth aspect, embodiments of the present application provides a computer readable storage medium having stored thereon computer program instructions that when executed by a processor, implement the data storage method in the first aspect.

BRIEF DESCRIPTION OF THE DRAWINGS

In order to more clearly illustrate technical solutions of embodiments of the present application, the drawings to be used in the embodiments of the present application will be briefly described. For those skilled in the art, other drawings can also be obtained from these drawings without any inventive effort.

DETAILED DESCRIPTION

Figure 1:
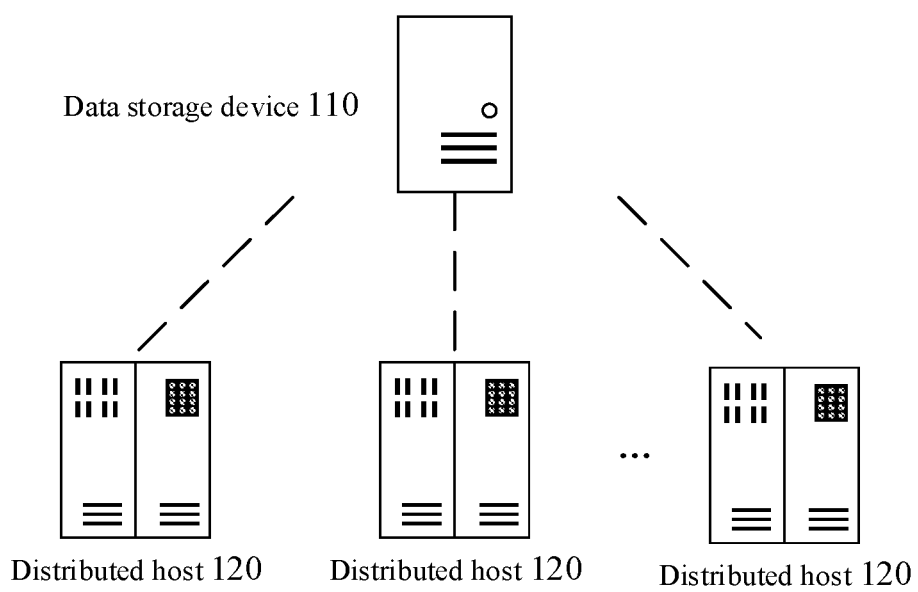
FIG. 1 is a schematic architecture diagram of a data storage system according to the present application.

Features and exemplary embodiments of various aspects of the present application will be described in detail below. In order to make the objects, technical solutions and advantages of the present application clearer, the present application is further described in detail below with reference to the drawings and specific embodiments. It should be understood, that the specific embodiments described herein are only intended to explain the present application, but not to limit the present application. For those skilled in the art, the present application may be implemented without some of these specific details. The following description of the embodiments is merely to provide a better understanding of the present application by illustrating examples of the present application.

It should be noted that, relational terms herein such as first and second are used only for distinguishing one entity or operation from another entity or operation, and do not necessarily require or imply any such actual relationship or order between these entities or operations. Moreover, the terms "comprising", "including", or any other variation thereof, are intended to encompass a non-exclusive inclusion, such that a process, a method, an article or a device including a series of elements includes not only those elements, but also includes other elements that are not explicitly listed or elements inherent to such a process, a method, an article or a device. Without further limitation, an element defined by "comprising . . . " does not exclude presence of additional same elements in a process, a method, an article or a device that includes the element.

At present, there are generally two methods for a user data storage scheme, which are as follows respectively:

Method 1: centralized management. Specifically, after acquiring user data, a distributed host of each area may send the acquired user data to a core distributed host for storage, namely, the core distributed host stores a full amount of user data, namely, user data for all areas.

Method 2: synchronous management. Specifically, after acquiring user data, a distributed host of each area may first store the acquired user data locally, and then synchronize the acquired user data to distributed hosts in other areas in real time, so that a full amount of user data is stored in distributed hosts deployed in each area.

It can be seen that, by using the above-mentioned two methods to store user data, user data for multiple areas will be stored together, and thus leakage of a full amount of user data would easily occur, and the security is low.

In order to solve the above-mentioned technical problems, embodiments of the present application provide a data storage method, a data storage apparatus, a data storage device and a storage medium. The data storage device acquires a first user identification and first user data of a first user, determines, from at least two preset distributed hosts located in different areas, a first identification distributed host corresponding to the first user identification and a first data distributed host corresponding to the first user data, and sends the first user identification to the first identification distributed host. The first identification distributed host stores the first user identification, and generates and stores a first identity identification corresponding to the first user identification, and sends the first identity identification to the data storage device. The data storage device sends the first identity identification and the first user data to the first data distributed host. The first data distributed host stores the first identity identification and the first user data in an associated manner. In this way, user data can be stored in a distributed host corresponding thereto, namely, distributed hosts located in different areas store user data corresponding thereto, so as to realize regional storage of user data and improve the security of user data storage.

A data storage method, a data storage apparatus, a data storage device and a storage medium provided by embodiments of the present application will be described in detail below through specific embodiments and application scenarios thereof with reference to the accompanying drawings.

The data storage method provided by embodiments of the present application may be applied to user data storage scenarios in fields of payment, insurance, social or rental, etc., and embodiments of the present application do not limit with respect to this aspect herein.

FIG. 1 is a schematic architecture diagram of a data storage system according to the present application. As shown in FIG. 1, the data storage system may include a data storage device 110 and at least two distributed hosts 120, which is not limited herein.

The data storage device 110 may be a server, a network attached storage (NAS) or a personal computer (PC), etc. The data storage device 110 may also be any one of the distributed hosts 120 or a module within any one of the distributed hosts 120, which is not limited herein.

The distributed hosts 120 are hosts distributed using a distributed architecture, and any two of the distributed hosts 120 are located in different areas. Optionally, the distributed host 120 may be composed of a cluster of hosts.

As shown in FIG. 1, the data storage device 110 separately communicates with at least two distributed hosts 120. Optionally, the communication may be wired communication or wireless communication. For example, the data storage device 110 communicates with the distributed hosts 120 using a network cable or WiFi.

As one example, the data storage device 110 may acquire a first user identification and first user data of a first user. The first user identification may be used to represent an identity of the first user, and may be a mobile phone number, an identity card number or a passport number, etc. The first user data may be personal data required for the first user to transact a service, and may be bank card information, social security card information or a personal address, etc. It can be understood that the first user identification and the first user data of the first user may include a plurality of first user identifications and first user data.

Illustratively, a terminal device may receive the first user identification and the first user data input by the first user at the terminal device, and send the first user identification and the first user data to the data storage device 110. Accordingly, the data storage device 110 receives the first user identification and the first user data sent by the terminal device.

The data storage device 110 may then determine, from at least two distributed hosts 120, a first identification distributed host corresponding to the first user identification and a first data distributed host corresponding to the first user data, and send the first user identification to the first identification distributed host. The first identification distributed host may be a host deployed in an area to which the first user identification belongs. The first data distributed host may be a host deployed in an area to which the first user data belongs. The first identification distributed host and the first data distributed host may be a same distributed host 120 or may be different distributed hosts 120.

The first identification distributed host may store the first user identification, and generate and store a first identity identification corresponding to the first user identification, and then send the first identity identification to the data storage device 110. The first identity may be used to indicate the identity of the first user. Optionally, the first identification distributed host may calculate a hash value of the first user identification based on a hash algorithm, and use the hash value as the first identity identification. The first identification distributed host may also randomly generate a universally unique identifier (UUID) corresponding to the first user identification on a one-to-one basis, and use the UUID as the first identity identification.

The data storage device 110 receives the first identity identification sent by the first identification distributed host, and sends the first identity identification and the first user data to the first data distributed host.

The first data distributed host may store the first identity identification and the first user data in an associated manner.

In this way, user data can be stored in a distributed host corresponding thereto, namely, distributed hosts located in different areas store user data corresponding thereto, so as to realize regional storage of user data and improve the security of user data storage.

The data storage method provided by embodiments of the present application will be described in detail below. Illustratively, the data storage method may be applied to the data storage system shown in FIG. 1.

Figure 2:
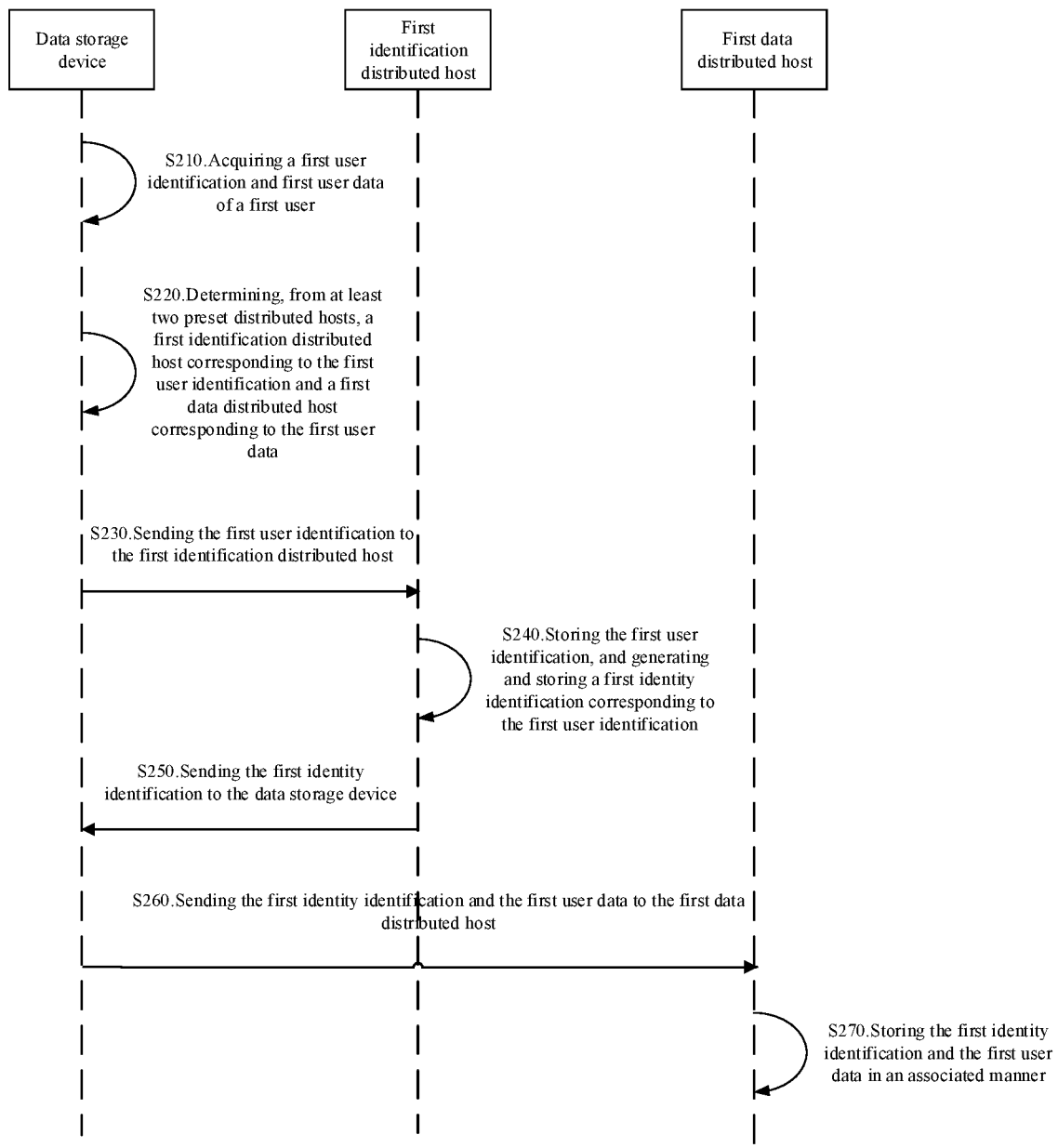
FIG. 2 is a schematic flowchart of an embodiment of a data storage method according to the present application.

FIG. 2 is a schematic flowchart of an embodiment of a data storage method according to the present application. As shown in FIG. 2, the data storage method may include the following steps:

S210, the data storage device acquires a first user identification and first user data of a first user.

In one embodiment, the data storage device may acquire a first user identification and first user data of a first user. The first user identification may be used to represent an identity of the first user, and may be a mobile phone number, an identity card number or a passport number, etc. The first user data may be personal data required for the first user to transact a service, and may be bank card information, social security card information or a personal address, etc. It can be understood that the first user identification and the first user data of the first user may include a plurality of first user identifications and first user data.

Illustratively, the data storage device may receive the first user identification and the first user data sent by a terminal device. In particular, the first user may input the first user identification and the first user data at the terminal device when transacting a service, and the terminal device may send the first user identification and the first user data to the data storage device in response to the user input. Accordingly, the data storage device receives the first user identification and the first user data sent by the terminal device.

As shown in FIG. 2, the data storage method may further include: S220, the data storage device determines, from at least two preset distributed hosts, a first identification distributed host corresponding to the first user identification and a first data distributed host corresponding to the first user data.

The at least two distributed hosts are located in different areas, and an area level of an area may be set as required. For example, there are three distributed hosts, i.e. a distributed host 1, a distributed host 2, and a distributed host 3. Herein, the distributed host 1 is located in an area 1, the distributed host 2 is located in an area 2, and the distributed host 3 is located in an area 3. Optionally, the area 1 is a country 1, the area 2 is a country 2, and the area 3 is a country 3.

Illustratively, the first identification distributed host may be a host deployed in an area to which the first user identification belongs. The first data distributed host may be a host deployed in an area to which the first user data belongs. It will be appreciated that the first identification distributed host and the first data distributed host may be a same distributed host or may be different distributed hosts.

In one embodiment, the data storage device may first determine, based on the first user identification and a preset correspondence relationship between user identifications and home areas, a home area corresponding to the first user identification, namely, an area to which the first user identification belongs, for example, a country to which a mobile phone number belongs. Then a first target area that is the same as the home area corresponding to the first user identification is determined from areas where the at least two distributed hosts are located, and a distributed host corresponding to the first target area, namely, a distributed host deployed in the first target area, is taken as the first identification distributed host. In this way, a user identification can be stored in a distributed host of its home location, so as to realize local storage of the user identification, which is convenient for a local authority to supervise.

In one embodiment, the data storage device may first determine, based on a user data type of the first user data and a preset correspondence relationship between user data types and home areas, a home area corresponding to the first user data, namely, an area to which the first user data belongs. A user data type may be used to characterize a category of user data, such as a category of user data 1 is bank card information of a country 1, and a category of user data 2 is social security card information of a country 2. Then a second target area that is the same as the home area corresponding to the first user data is determined from areas where the at least two distributed hosts are located, and a distributed host corresponding to the second target area, namely, a distributed host deployed in the second target area, is taken as the first data distributed host. In this way, user data can be stored in a distributed host of its home location, so as to realize local storage of the user data, which is convenient for a local authority to supervise.

As shown in FIG. 2, the data storage method may further include: S230, the data storage device sends the first user identification to the first identification distributed host.

As shown in FIG. 2, the data storage method may further include: S240, the first identification distributed host stores the first user identification, and generates and stores a first identity identification corresponding to the first user identification.

In particular, the first identification distributed host receives and stores the first user identification sent by the data storage device, and at the same time generates and stores a first identity identification corresponding to the first user identification. Illustratively, the first identification distributed host may first query whether the first user identification is stored in the first identification distributed host. In the case where the first user identification is not stored in the first identification distributed host, a first identity identification corresponding to the first user identification is generated, and a correspondence relationship between the first user identification and the first identity identification is established and stored.

Optionally, the first identification distributed host may calculate a hash value of the first user identification based on a hash algorithm, and use the hash value as the first identity identification. The first identification distributed host may also randomly generate a UUID corresponding to the first user identification on a one-to-one basis, and take the UUID as the first identity identification.

As shown in FIG. 2, the data storage method may further include: the first identification distributed host sends the first identity identification to the data storage device S250.

As shown in FIG. 2, the data storage method may further include: S260, the data storage device sends the first identity identification and the first user data to the first data distributed host.

In particular, the data storage device receives the first identity identification sent by the first identification distributed host, and sends the first identity identification and the first user data to the first data distributed host.

As shown in FIG. 2, the data storage method may further include: S270, the first data distributed host stores the first identity identification and the first user data in an associated manner.

Specifically, the first data distributed host receives the first identity identification and the first user data sent by the data storage device and stores the first identity identification in association with the first user data.

In an embodiment of the present application, a data storage device acquires a first user identification and first user data of a first user, determines, from at least two preset distributed hosts located in different areas, a first identification distributed host corresponding to the first user identification and a first data distributed host corresponding to the first user data, and sends the first user identification to the first identification distributed host. The first identification distributed host stores the first user identification, and generates and stores a first identity identification corresponding to the first user identification, and sends the first identity identification to the data storage device. The data storage device sends the first identity identification and the first user data to the first data distributed host. The first data distributed host stores the first identity identification and the first user data in an associated manner. In this way, user data can be stored in a distributed host corresponding thereto, namely, distributed hosts located in different areas store user data corresponding thereto, so as to realize regional storage of user data and improve the security of user data storage.

A maintenance of the stored user identifications and user data, i.e. updating, deleting and adding of user identifications and user data, will be described in detail as follows.

In one embodiment, the method may further include:

The data storage device sends a first identification update request to the first identification distributed host. The first identification update request includes the first user identification and a second user identification of the first user. The second user identification is used to replace the first user identification, and a home area of the second user identification is the same as the home area of the first user identification. For example, the first user identification may be a mobile phone number 1 belonging to a country 1 which is no longer used by the user, and the second user identification may be a mobile phone number 2 belonging to the country 1 which is newly changed by the user.

Illustratively, under a condition that the first user wants to update the stored first user identification, the first user may input the first user identification and the second user identification to the terminal device. In response to the user input, the terminal device sends a first identification update request including the first user identification and the second user identification to the data storage device, which in turn sends the first identification update request to the first identification distributed host.

The first identification distributed host receives the first identification update request sent by the data storage device, and updates the stored first user identification to the second user identification in response to the first identification update request sent by the data storage device, so as to realize flexible updating of user identifications belonging to a same area.

In one embodiment, the method may further include:

The data storage device acquires a third user identification of the first user. The third user identification is used to replace the first user identification, and a home area of the first user identification is different from a home area of the third user identification, for example, the first user identification may be a mobile phone number 1 belonging to a country 1 which is no longer used by the user, and the third user identification may be a mobile phone number 2 belonging to a country 2 which is newly changed by the user. A second identification distributed host corresponding to the third user identification is then determined from the at least two distributed hosts. Specific details thereof are similar to those of S220, which will not be described in detail herein. A second identification update request is then sent to the second identification distributed host. The second identification update request includes the first identity identification and the third user identification.

The second identification distributed host receives the second identification update request sent by the data storage device, and stores the first identity identification and the third user identification in an associated manner in response to the second identification update request sent by the data storage device. At the same time, a first identification deletion request is sent to the first identification distributed host. The first identification deletion request include the first user identification.

The first identification distributed host receives the first identification deletion request sent by the second identification distributed host, and deletes the stored first user identification and first identity identification in response to the first identification deletion request sent by the second identification distributed host. In this way, flexible updating of user identifications belonging to different areas can be achieved.

In one embodiment, the method may further include:

The data storage device sends a second identification deletion request to the first identification distributed host. The second identification deletion request includes the first user identification.

Illustratively, under a condition that the first user wants to delete the stored first user identification, the first user may input the first user identification to the terminal device. In response to the user input, the terminal device sends a second identification deletion request including the first user identification to the data storage device, which in turn sends the second identification deletion request to the first identification distributed host.

The first identification distributed host receives the second identification deletion request sent by the data storage device, and deletes the stored first user identification and first identity identification in response to the second identification deletion request sent by the data storage device, so as to realize quick deletion of a user identification.

In one embodiment, the method may further include:

The data storage device sends a data update request to the first data distributed host. The data update request includes the first identity identification and second user data of the first user. The second user data is used to replace the first user data, and a user data type of the first user data is the same as a user data type of the second user data. For example, the first user data and the second user data are bank card information of a same country.

Illustratively, under a condition that the first user wants to update the stored first user data, the first user may input the first user identification and the second user data to the terminal device. In response to the user input, the terminal device sends the first user identification and the second user data to the data storage device. The data storage device acquires the first identity identification from the first identification distributed host based on the first user identification, and then sends the data update request including the first identity identification and the second user data to the first data distributed host.

The first data distributed host receives the data update request sent by the data storage device, and in response to the data update request sent by the data storage device, queries the first user data stored in association with the first identity identification, and updates the first user data to the second user data, thereby achieving flexible updating of user data.

In one embodiment, the method may further include:

The data storage device sends a data deletion request to the first data distributed host. The data deletion request includes the first identity identification.

Illustratively, under a condition that the first user wants to delete the stored first user data, the first user may input the first user identification to the terminal device. In response to the user input, the terminal device sends the first user identification to the data storage device. The data storage device acquires the first identity identification from the first identification distributed host based on the first user identification, and then sends the data deletion request including the first identity identification to the first data distributed host.

The first data distributed host receives and responds to the data deletion request sent by the data storage device, queries the first user data stored in association with the first identity identification, and deletes the first user data, thereby achieving quick deletion of user data.

In one embodiment, the method may further include:

The data storage device acquires a fourth user identification of the first user and fourth user data. The fourth user identification is an identification that the first user wants to newly add, and the fourth user data is data that the first user wants to newly add. Then a fourth identification distributed host corresponding to the fourth user identification and a fourth data distributed host corresponding to the fourth user data are determined from the at least two distributed hosts, and the fourth user identification is sent to the fourth identification distributed host.

The fourth identification distributed host receives and stores the fourth user identification sent by the data storage device, and generates and stores a fourth identity identification corresponding to the fourth user identification. The fourth identity identification is then sent to the data storage device.

The data storage device receives the fourth identity identification sent by the fourth identification distributed host, and sends the fourth identity identification and the fourth user data to the fourth data distributed host in response to the fourth identity identification sent by the fourth identification distributed host.

The fourth data distributed host stores the fourth identity identification and the fourth user data in an associated manner, so as to realize rapid addition of a user identification and user data.

Querying and using of the stored user identifications and user data will be described in detail below, and specific details thereof are as follows.

In one embodiment, the method may further include:

The data storage device first acquires a target user identification of a target user. The target user is a user who has previously transacted a service, and the target user identification is a previously stored user identification. Then a target identification distributed host corresponding to the target user identification, namely, a distributed host storing the target user identification is determined from the at least two distributed hosts, and the target user identification is sent to the target identification distributed host.

Illustratively, under a condition that the target user wants to use the stored user data, the target user may input the target user identification to the terminal device. In response to the user input, the terminal device sends a target user identification to the data storage device. The data storage device sends the target user identification to the target identification distributed host.

The target identification distributed host receives the target user identification sent by the data storage device, queries a target identity identification corresponding to the target user identification, and then sends the target identity identification to the data storage device.

The data storage device receives the target identity identification sent by the target identification distributed host, and sends the target identity identification to the at least two distributed hosts respectively, so that the at least two distributed hosts respectively query target user data associated with the target identity identification, namely, the at least two distributed hosts query whether user data of the target user is stored therein. If the target user data is found, the target user data may be sent to the data storage device. The data storage device receives the target user data sent by a distributed host where the queried target user data is found, and then may apply the data to a corresponding scenario, such as a payment scenario. In this way, during a process of using user data, complete user data can be obtained from distributed hosts in different areas, so as to improve the security of using user data.

In one embodiment, the method may further include:

The data storage device first acquires a target user identification of a target user and a home area corresponding to target user data of the target user. The home area corresponding to the target user data is an area to which the target user data belongs. Then a target identification distributed host corresponding to the target user identification, and a target data distributed host corresponding to the home area corresponding to the target user data, namely, a distributed host storing the target user data, are determined from the at least two distributed hosts, and the target user identification is sent to the target identification distributed host.

Illustratively, under a condition that the target user wants to use the stored user data, the target user may input the target user identification and a user data type of the target user data to the terminal device. In response to the user input, the terminal device sends the target user identification and the user data type to the data storage device, and the data storage device determines, based on the user data type, a home area to which the target user data corresponds.

The target identification distributed host receives the target user identification sent by the data storage device, queries a target identity identification corresponding to the target user identification, and then sends the target identity identification to the data storage device.

The data storage device receives the target identity identification sent by the target identification distributed host, and sends the target identity identification to the target data distributed host, so that the target data distributed host queries the target user data associated with the target identity identification, and then sends the target user data to the data storage device. The data storage device receives the target user data sent by the target data distributed host. The data may in turn be applied to a corresponding scenario, such as a payment scenario. In this way, during a process of using user data, user data that a user wants to use can be flexibly acquired, so as to improve the user experience.

In one embodiment, the data storage device may be any one of at least two distributed hosts, referred to as a data storage host. The data storage method provided by embodiments of the present application are described in detail below with reference to a specific example, as follows.

An administrator may deploy at least two distributed hosts in different areas, respectively.

A user identification may serve as a user identification primary key in a user identity tag, and the user identity tag may further include primary key attachment information corresponding to the user identification primary key on a one-to-one basis; and a type of the user identity tag corresponds to a user identification type of the user identification primary key. The administrator may set a user information deployment policy, that is to say, based on the user identification primary key in the user identity tag, a correspondence relationship between user identification types of user identification primary keys and home areas, namely, a correspondence relationship between user identifications and home areas may be established.

User data may serve as a core content of a user data tag, and a type of the user data tag corresponds to a user data type of the user data. The administrator may set a user data deployment policy, that is to say, based on the user data type of the user data, a correspondence relationship between user data types and home areas may be established.

For example, there are three distributed hosts, which are distributed hosts A, B, and C, deployed in countries A, B, and C respectively, as shown in Table 1.

TABLE 1

| Area | Country A | Country B | Country C |
|---|---|---|---|
| Distributed host | Distributed host A | Distributed host B | Distributed host C |

At the same time, three types of user identity tags are set, which are a user identity tag A, a user identity tag B and a user identity tag C, respectively, as shown in Table 2.

TABLE 2

| | User identity tag | | |
|---|---|---|---|
| | User identity tag A | User identity tag B | User identity tag C |
| User identification primary key | Mobile phone number in Country A | Mobile phone number in Country B | Mobile phone number in Country C |
| Primary key attachment information | Mailbox number | Mailbox number | Mailbox number |

The user identity label A, the user identity label B and the user identity label C all include a user identification primary key and primary key attachment information, and a user identification type of a user identification primary key in the user identity label A is a mobile phone number in Country A, and a user identification type of a user identification primary key in the user identity label B is a mobile phone number in Country B, and a user identification type of a user identification primary key in the user identity label C is a mobile phone number in Country C, and information types of primary key attachment information are all a mailbox number.

At the same time, three types of user data tags are set, which are a user data tag A, a user data tag B and a user data tag C respectively, and a specific structure is as shown in Table 3.

TABLE 3

| User data tag | User data tag A | User data tag B | User data tag C |
|---|---|---|---|
| User data | Bank card information in Country A | Bank card information in Country B | Bank card information in Country C |

User data types of user data in the user data tag A, the user data tag B and the user data tag C are bank card information in Country A, bank card information in Country B and bank card information in Country C respectively.

Then, the administrator may establish a correspondence relationship between user identification types and home areas based on table 2, as shown in Table 4.

TABLE 4

| Home area | Country A | Country B | Country C |
|---|---|---|---|
| User identification | Mobile phone number in Country A | Mobile phone number in Country B | Mobile phone number in Country C |

At the same time, the administrator may establish a correspondence relationship between user data types and home areas based on Tables 1 and 3, as shown in Table 5.

TABLE 5

| Home area | Country A | Country B | Country C |
|---|---|---|---|
| User data | Bank card information in Country A | Bank card information in Country B | Bank card information in Country C |

After setting a correspondence relationship between user identification types and home areas and a correspondence relationship between user data types and home areas, a first user may input a first user identification primary key, i.e. a first user identification, first primary key attachment information and first user data, at a terminal device. In response to the user input, the terminal device may send the first user identification primary key, the first primary key attachment information, and the first user data to the data storage host.

The data storage host may determine a home area corresponding to the first user identification primary key based on the first user identification primary key and the correspondence relationship between user identification types and home areas. Then a first target area that is the same as the home area corresponding to the first user identification primary key is determined from areas where at least two distributed hosts are located, and a distributed host deployed in the first target area is taken as a first identification distributed host. At the same time, a home area corresponding to the first user data may be determined based on a user data type of the first user data and the correspondence relationship between user data types and home areas. Then a second target area that is the same as the home area corresponding to the first user data is determined from areas where at least two distributed hosts are located, and a distributed host corresponding to the second target area, namely, a distributed host deployed in the second target area, is taken as a first data distributed host.

If both the first identification distributed host and the first data distributed host are the data storage host, the data storage host may first query whether it stores the first user identification primary key. If the first user identification primary key is not stored, the first user identification primary key and the first primary key attachment information are stored in the form of a user identity tag, and a first identity identification corresponding to the first user identification primary key is generated and stored. The first identity identification is then broadcast to other distributed hosts. The other distributed hosts store the first identity identification as a non-local identity identification. The data storage host may then store the first identity identification and the first user data in an associated manner, wherein the first user data is stored in association with the first identity identification in the form of a user data tag.

If the first identification distributed host is the data storage host and the first data distributed host is not the data storage host, the data storage host may first query whether it stores the first user identification primary key. If the first user identification primary key is not stored, the first user identification primary key and the first primary key attachment information are stored in the form of a user identity tag, and a first identity identification corresponding to the first user identification primary key is generated and stored. The first identity identification is then broadcast to other distributed hosts, so that the other distributed hosts store the first identity identification as a non-local identity identification. The data storage host may send the first identity identification and the first user data to the first data distributed host. The first data distributed host stores the first identity identification and the first user data in an associated manner.

If the first identification distributed host is not the data storage host and the first data distributed host is the data storage host, the data storage host may send the first user identification primary key to the first identification distributed host. The first identification distributed host may first query whether it stores the first user identification primary key. If the first user identification primary key is not stored, the first user identification primary key and the first primary key attachment information are stored in the form of a user identity tag, and a first identity identification corresponding to the first user identification primary key is generated and stored. The first identity identification is then broadcast to other distributed hosts including the data storage host, so that the other distributed hosts store the first identity identification as a non-local identity identification. The data storage host stores the first identity identification and the first user data in an associated manner.

If neither the first identification distributed host nor the first data distributed host is the data storage host, the data storage host may send the first user identification primary key to the first identification distributed host. The first identification distributed host may first query whether it stores the first user identification primary key. If the first user identification primary key is not stored, the first user identification primary key and the first primary key attachment information are stored in the form of a user identity tag, and a first identity identification corresponding to the first user identification primary key is generated and stored. The first identity identification is then broadcast to other distributed hosts including the data storage host, so that the other distributed hosts store the first identity identification as a non-local identity identification. The data storage host may send the first identity identification and the first user data to the first data distributed host. The first data distributed host stores the first identity identification and the first user data in an associated manner.

Under a condition that the first user wants to update the stored first user identification primary key, the first user may input the first user identification primary key and a second user identification primary key to the terminal device. In response to the user input, the terminal device sends a first identification update request including the first user identification primary key and the second user identification primary key to the data storage host.

If the first identification distributed host corresponding to the first user identification primary key is the data storage host, the data storage host may update the stored first user identification primary key to the second user identification primary key in response to the first identification update request.

If the first identification distributed host corresponding to the first user identification primary key is not the data storage host, the data storage host may send a first identification update request to the first identification distributed host. The first identification distributed host updates the stored first user identification primary key to the second user identification primary key in response to the first identification update request.

Optionally, the first identification update request may further include the first primary key attachment information and second primary key attachment information, and thus the stored primary key attachment information may be updated.

Under a condition that the first user wants to delete the stored first user identification primary key, the first user may input the first user identification primary key to the terminal device. In response to the user input, the terminal device sends a second identification deletion request including the first user identification primary key to the data storage host.

If the first identification distributed host corresponding to the first user identification primary key is the data storage host, the data storage host may delete the user identity tag and the first identity identification corresponding to the first user identification primary key in response to the second identification deletion request. At the same time, a notification for deleting the first identity identification is broadcast to other distributed hosts, so that the other distributed hosts delete the stored first identity identification.

If the first identification distributed host corresponding to the first user identification primary key is not the data storage host, the data storage host may send the second identification deletion request to the first identification distributed host. The first identification distributed host deletes the user identity tag and the first identity identification corresponding to the first user identification primary key in response to the second identification deletion request. At the same time, a notification for deleting the first identity identification is broadcast to other distributed hosts including the data storage host, so that the other distributed hosts delete the stored first identity identification.

Under a condition that the first user wants to update the stored first user data, the first user may input the first user identification primary key and second user data to the terminal device. In response to the user input, the terminal device sends the first user identification primary key and the second user data to the data storage host.

If both the first identification distributed host corresponding to the first user identification primary key and the first data distributed host corresponding to the second user data are the data storage host, the data storage host may acquire the stored first identity identification based on the first user identification primary key, query the first user data stored in association with the first identity identification, and update the first user data to the second user data.

If the first identification distributed host corresponding to the first user identification primary key is the data storage host, and the first data distributed host corresponding to the second user data is not the data storage host, the data storage host may acquire the stored first identity identification based on the first user identification primary key, and send a data update request including the first identity identification and the second user data to the first data distributed host. In response to the data update request, the first data distributed host queries the first user data stored in association with the first identity identification and updates the first user data to the second user data.

If the first identification distributed host corresponding to the first user identification primary key is not the data storage host and the first data distributed host corresponding to the second user data is the data storage host, the data storage host may send the first user identification primary key to the first identification distributed host. The first identification distributed host acquires the stored first identity identification based on the first user identification primary key, and sends the first identity identification to the data storage host. The data storage host queries the first user data stored in association with the first identity identification and updates the first user data to second user data.

If neither the first identification distributed host corresponding to the first user identification primary key nor the first data distributed host corresponding to the second user data is the data storage host, the data storage host may send the first user identification primary key to the first identification distributed host. The first identification distributed host acquires the stored first identity identification based on the first user identification primary key, and sends the first identity identification to the data storage host. The data storage host sends a data update request including the first identity identification and the second user data to the first data distributed host. In response to the data update request, the first data distributed host queries the first user data stored in association with the first identity identification and updates the first user data to the second user data.

Under a condition that the first user wants to delete the stored first user data, the first user may input the first user identification primary key to the terminal device. In response to the user input, the terminal device sends the first user identification primary key to the data storage host.

If both the first identification distributed host corresponding to the first user identification primary key and the first data distributed host corresponding to the second user data are the data storage host, the data storage host may acquire the stored first identity identification based on the first user identification primary key, query the first user data stored in association with the first identity identification, and delete the first user data.

If the first identification distributed host corresponding to the first user identification primary key is the data storage host, and the first data distributed host corresponding to the second user data is not the data storage host, the data storage host may acquire the stored first identity identification based on the first user identification primary key, and send a data deletion request including the first identity identification to the first data distributed host. In response to the data deletion request, the first data distributed host queries the first user data stored in association with the first identity identification, and deletes the first user data.

If the first identification distributed host corresponding to the first user identification primary key is not the data storage host and the first data distributed host corresponding to the second user data is the data storage host, the data storage host may send the first user identification primary key to the first identification distributed host. The first identification distributed host acquires the stored first identity identification based on the first user identification primary key, and sends the first identity identification to the data storage host. The data storage host queries the first user data stored in association with the first identity identification and deletes the first user data.

If neither the first identification distributed host corresponding to the first user identification primary key nor the first data distributed host corresponding to the second user data is the data storage host, the data storage host may send the first user identification primary key to the first identification distributed host. The first identification distributed host acquires the stored first identity identification based on the first user identification primary key, and sends the first identity identification to the data storage host. The data storage host sends a data deletion request including the first identity identification to the first data distributed host. In response to the data deletion request, the first data distributed host queries the first user data stored in association with the first identity identification, and deletes the first user data.

Under a condition that a target user wants to use the stored user data, the target user may input a target user identification and a user data type of target user data to the terminal device. In response to the user input, the terminal device sends the target user identification and the user data type to the data storage host, and the data storage host determines a home area corresponding to the target user data based on the user data type. Then a target identification distributed host corresponding to the target user identification and a target data distributed host corresponding to the home area corresponding to the target user data are determined from at least two distributed hosts.

If the target identification distributed host and the target data distributed host are both the data storage host, the data storage host may query a target identify identification corresponding to the target user identification and query the target user data stored in association with the target identify identification. The data may in turn be applied to a corresponding scenario, such as a payment scenario.

If the target identification distributed host is the data storage host and the target data distributed host is not the data storage host, the data storage host may query a target identity identification corresponding to the target user identification and send the target identity identification to the target data distributed host. The target data distributed host queries the target user data associated with the target identity identification and sends the data to the data storage host. The data storage host may apply the data to a corresponding scenario, such as a payment scenario.

If the target identification distributed host is not the data storage host and the target data distributed host is the data storage host, the data storage host may send the target user identification to the target identification distributed host. The target identification distributed host queries a target identity identification corresponding to the target user identification, and then sends the target identity identification to the data storage host. The data storage host queries the target user data stored in association with the target identity identification. The data may in turn be applied to a corresponding scenario, such as a payment scenario.

If neither the target identification distributed host nor the target data distributed host is the data storage host, the data storage host may send the target user identification to the target identification distributed host. The target identification distributed host queries a target identity identification corresponding to the target user identification, and then sends the target identity identification to the data storage host. The data storage host sends the target identity identification to the target data distributed host. The target data distributed host queries the target user data associated with the target identity identification and sends the data to the data storage host. The data storage host may apply the data to a corresponding scenario, such as a payment scenario.

As a specific example, when a user initiates a payment for a purchase on a global e-commerce platform, any bank card belonging to the user may be selected for payment through a payment tool bound with cards, regardless of an area where the card is issued. For example, a user X lives in a country A, but is a citizen of a country B and has a bank card belonging to a country C, a personal address of the user X should be stored in a distributed host deployed in the country A, identity information of the user X should be stored in a distributed host deployed in the country B, and national bank card information of the user X should be stored in a distributed host deployed in the country C. When user X makes a payment, these information stored in distributed hosts in different areas may be acquired in time.

Figure 3:
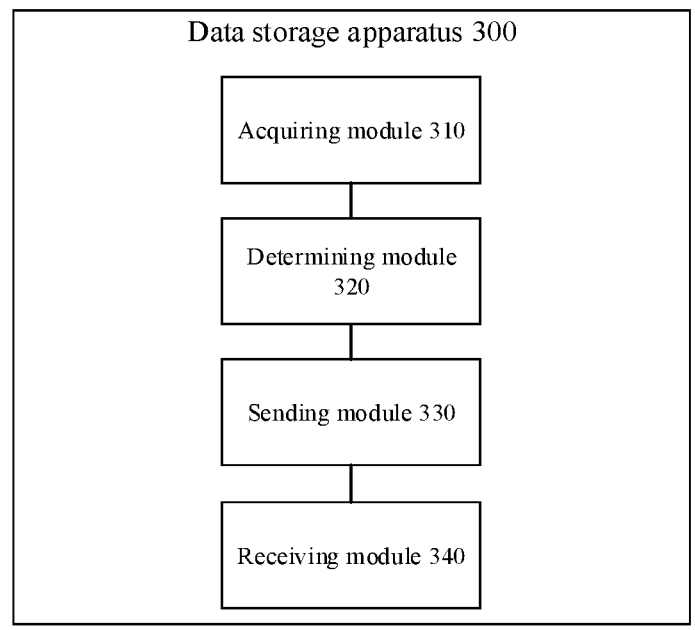
FIG. 3 is a schematic structural diagram of an embodiment of a data storage apparatus according to the present application.

Based on the data storage method provided by embodiments of the present application, embodiments of the present application further provides a data storage apparatus applied to a data storage device. As shown in FIG. 3, the data storage apparatus 300 may include: an acquiring module 310, a determining module 320, a sending module 330 and a receiving module 340.

The acquiring module 310 is configured to acquire a first user identification and first user data of a first user.

The determining module 320 is configured to determine, from at least two preset distributed hosts, a first identification distributed host corresponding to the first user identification and a first data distributed host corresponding to the first user data, wherein the first identification distributed host is the same as or different from the first data distributed host, and the at least two distributed hosts are located in different areas.

The sending module 330 is configured to send the first user identification to the first identification distributed host, so that the first identification distributed host stores the first user identification, and generates and stores a first identity identification corresponding to the first user identification.

The receiving module 340 is configured to receive the first identity identification sent by the first identification distributed host.

The sending module 330 is further configured to send the first identity identification and the first user data to the first data distributed host, so that the first data distributed host stores the first identity identification and the first user data in an associated manner.

In one embodiment, the determining module 320 specifically includes:

A first determining unit configured to determine a home area corresponding to the first user identification based on the first user identification and a preset correspondence relationship between user identifications and home areas;

The first determining unit is further configured to determine, from areas where the at least two distributed hosts are located, a first target area that is the same as the home area corresponding to the first user identification, and take a distributed host corresponding to the first target area as the first identification distributed host.

In one embodiment, the determining module 320 specifically includes:

A second determining unit configured to determine a home area corresponding to the first user data based on a user data type of the first user data and a preset correspondence relationship between user data types and home areas;

The second determining unit is further configured to determine, from areas where the at least two distributed hosts are located, a second target area that is the same as the home area corresponding to the first user data, and take a distributed host corresponding to the second target area as the first data distributed host.

In one embodiment, the sending module 330 is further configured to send a first identification update request to the first identification distributed host, wherein the first identification update request includes the first user identification and a second user identification of the first user, and a home area of the first user identification is the same as a home area of the second user identification, so that the first identification distributed host updates the stored first user identification to the second user identification in response to the first identification update request.

In one embodiment, the acquiring module 310 is further configured to acquire a third user identification of the first user, wherein a home area of the first user identification is different from a home area of the third user identification.

The determining module 320 is further configured to determine, from the at least two distributed hosts, a second identification distributed host corresponding to the third user identification.

The sending module 330 may further be configured to send a second identification update request to the second identification distributed host, wherein the second identification update request includes the first identity identification and the third user identification, so that the second identification distributed host stores the first identity identification and the third user identification in an associated manner in response to the second identification update request.

The sending module 330 may further be configured to send a first identification deletion request to the first identification distributed host, wherein the first identification deletion request includes the first user identification, so that the first identification distributed host deletes the stored first user identification and first identity identification in response to the first identification deletion request.

In one embodiment, the sending module 330 is further configured to send a second identification deletion request to the first identification distributed host, wherein the second identification deletion request includes the first user identification, so that the first identification distributed host deletes the stored first user identification and first identity identification in response to the second identification deletion request.

In one embodiment, the sending module 330 is further configured to send a data update request to the first data distributed host, wherein the data update request includes the first identity identification and second user data of the first user, and a user data type of the first user data is the same as a user data type of the second user data, so that the first data distributed host updates the first user data stored in association with the first identity identification to the second user data in response to the data update request.

In one embodiment, the sending module 330 is further configured to send a data deletion request to the first data distributed host, wherein the data deletion request includes the first identity identification, so that the first data distributed host deletes the first user data stored in association with the first identity identification in response to the data deletion request.

In one embodiment, the acquiring module 310 is further configured to acquire a target user identification of a target user.

The determining module may further be configured to determine, from the at least two distributed hosts, a target identification distributed host corresponding to the target user identification.

The sending module may further be configured to send the target user identification to the target identification distributed host, so that the target identification distributed host queries a target identity identification corresponding to the target user identification.

The receiving module may further be configured to receive the target identity identification sent by the target identification distributed host.

The sending module may further be configured to send the target identity identification to the at least two distributed hosts respectively, so that the at least two distributed hosts query target user data stored in association with the target identity identifications respectively.

The receiving module may further be configured to receive the target user data sent by a distributed host obtaining the queried target user data.

In one embodiment, the acquiring module 310 is further configured to acquire a target user identification of a target user and a home area corresponding to target user data of the target user.

The determining module may further be configured to determine, from the at least two distributed hosts, a target identification distributed host corresponding to the target user identification and a target data distributed host corresponding to the home area corresponding to the target user data.

The sending module may further be configured to send the target user identification to the target identification distributed host, so that the target identification distributed host queries a target identity identification corresponding to the target user identification.

The receiving module may further be configured to receive the target identity identification sent by the target identification distributed host.

The sending module may further be configured to send the target identity identification to the target data distributed host, so that the target data distributed host queries target user data stored in association with the target identity identification.

The receiving module may further be configured to receive the target user data sent by the target data distributed host.

It can be understood that various modules/units in the data storage apparatus 300 shown in FIG. 3 has a function of implementing various steps executed by the data storage apparatus in FIG. 2 and can achieve a corresponding technical effect, and for the sake of brevity, the description thereof will not be described in detail herein.

Figure 4:
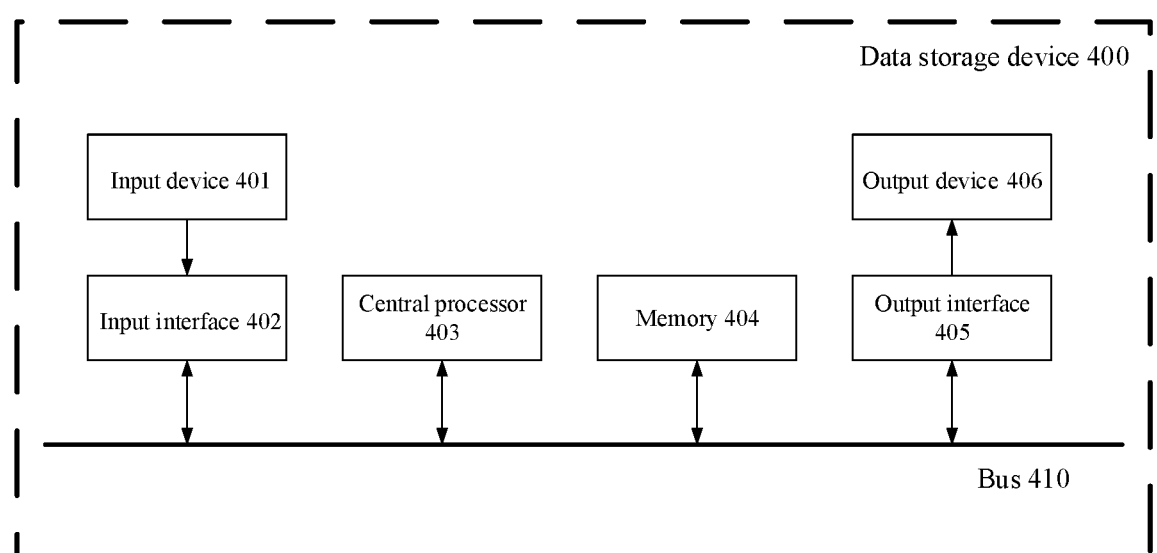
FIG. 4 is a schematic structural diagram of an embodiment of a data storage device according to the present application.

FIG. 4 is a schematic structural diagram of an embodiment of a data storage device according to the present application.

As shown in FIG. 4, the data storage device 400 in the embodiment includes an input device 401, an input interface 402, a central processor 403, a memory 404, an output interface 405, and an output device 406. The input interface 402, the central processor 403, the memory 404 and the output interface 405 are connected to each other via a bus 410, and the input device 401 and the output device 406 are connected to the bus 410 via the input interface 402 and the output interface 405, respectively, and thus connected to other components of the data storage device 400.

Specifically, the input device 401 receives input information from the outside and transmits the input information to the central processor 403 through the input interface 402; the central processor 403 processes the input information based on computer-executable instructions stored in the memory 404 to generate output information, stores the output information in the memory 404 temporarily or permanently, and then transmits the output information to the output device 406 through the output interface 405; the output device 406 outputs the output information to the outside of the data storage device 400 for use by a user.

In one embodiment, the data storage device 400 shown in FIG. 4 includes: the memory 404 for storing a program; and the processor 403 for running the program stored in the memory so as to implement the data storage method provided by embodiments of the present application.

Embodiments of the present application further provide a computer-readable storage medium having computer program instructions stored thereon; the computer program instructions, when executed by a processor, implement the data storage method provided by embodiments of the present application. Examples of the computer-readable storage medium include a non-transitory computer-readable storage medium such as a read-only memory (ROM), a random access memory (RAM), a magnetic or optical disk, etc.

It should be understood that various embodiments in the description are described in a progressive manner, and the same or similar parts of various embodiments may be referred to each other, which will not be described in detail herein for brevity. The present application is not limited to specific configurations and processes described above and shown in the drawings. For the sake of brevity, a detailed description of known methods is omitted herein. In the embodiments described above, a number of specific steps have been described and shown as examples. However, the method processes of the present application are not limited to specific steps described and shown, and those skilled in the art can make various changes, modifications and additions, or change the order of steps after they comprehend the spirit of the present application.

Functional blocks shown in the structural block diagrams described above may be implemented in hardware, software, firmware, or a combination thereof. When implemented in hardware, it may be, for example, an electronic circuit, an application specific integrated circuit (ASIC), appropriate firmware, a plug-in, a function card, etc. When implemented in software, elements of the present application are programs or code segments configured to perform desired tasks. The programs or code segments may be stored in a machine-readable medium or may be transmitted over a transmission medium or communication link via a data signal carried in a carrier wave. A "machine-readable medium" may include any medium capable of storing or transmitting information. Examples of a machine-readable medium include an electronic circuit, a semiconductor memory device, a read-only memory (ROM), a flash memory, an erasable ROM (EROM), a floppy disk, a CD-ROM, an optical disk, a hard disk, a fiber optic medium, a radio frequency (RF) link, etc. The code segments may be downloaded via a computer network such as the Internet, an intranet, etc.

It should also be noted that exemplary embodiments mentioned in the present application describe some methods or systems based on a series of steps or apparatuses. However, the present application is not limited to the order of the steps described above, that is to say, the steps may be performed in the order mentioned in the embodiments, may be performed in an order different from that in the embodiments, or several steps may be performed simultaneously.

Aspects of the present application are described above with reference to flowcharts and/or block diagrams of methods, apparatus (systems) and computer program products according to embodiments of the present application. It should be understood that, each block in the flowcharts and/or block diagrams, and a combination of blocks in the flowcharts and/or block diagrams, may be implemented by computer program instructions. These computer program instructions may be provided to a processor of a universal computer, a special-purpose computer, or other programmable data processing apparatuses to produce a machine, such that these instructions executed via a processor of a computer or other programmable data processing apparatuses enable implementation of a function/action specified in one or more blocks of the flowcharts and/or block diagrams. Such a processor may be, but is not limited to, a general purpose processor, a special purpose processor, a special application processor, or a field programmable logic circuit. It may also be understood that, each block in the block diagrams and/or flowcharts and a combination of blocks in the block diagrams and/or flowcharts may also be implemented by special-purpose hardware performing a specified function or action, or may be implemented by a combination of special-purpose hardware and computer instructions.

The foregoing description merely relates to specific implementations of the present application. Those skilled in the art may clearly understand that, for the convenience and conciseness of the description, a specific working process of the system, module and unit described above may refer to a corresponding process in embodiments of the aforementioned method, which will not be described in detail herein. It should be understood that a protection scope of the present application is not limited thereto, and any person skilled in the art may easily think of various equivalent modifications or replacements within a scope of the technology disclosed in the present application, and these modifications or replacements shall be covered within the protection scope of the present application.

What is claimed is:

1. A data storage method applied to a data storage device, comprising:
   acquiring a first user identification and first user data of a first user;
   determining, from at least two preset distributed hosts, a first identification distributed host corresponding to the first user identification and a first data distributed host corresponding to the first user data, wherein the first identification distributed host is the same as or different from the first data distributed host, and the at least two distributed hosts are located in different areas;
   sending the first user identification to the first identification distributed host, so that the first identification distributed host stores the first user identification, and generates and stores a first identity identification corresponding to the first user identification;
   receiving the first identity identification sent by the first identification distributed host; and
   sending the first identity identification and the first user data to the first data distributed host, so that the first data distributed host stores the first identity identification and the first user data in an associated manner.

2. The method of claim 1, wherein the determining, from at least two preset distributed hosts, a first identification distributed host corresponding to the first user identification comprises:
   determining a home area corresponding to the first user identification based on the first user identification and a preset correspondence relationship between user identifications and home areas; and
   determining, from areas where the at least two distributed hosts are located, a first target area that is the same as the home area corresponding to the first user identification, and taking a distributed host corresponding to the first target area as the first identification distributed host.

3. The method of claim 1, wherein the determining, from at least two preset distributed hosts, a first data distributed host corresponding to the first user data comprises:
   determining a home area corresponding to the first user data based on a user data type of the first user data and a preset correspondence relationship between user data types and home areas; and
   determining, from areas where the at least two distributed hosts are located, a second target area that is the same as the home area corresponding to the first user data, and taking a distributed host corresponding to the second target area as the first data distributed host.

4. The method of claim 1, further comprising:
   sending a first identification update request to the first identification distributed host, wherein the first identification update request comprises the first user identification and a second user identification of the first user, and a home area of the first user identification is the same as a home area of the second user identification, so that the first identification distributed host updates the stored first user identification to the second user identification in response to the first identification update request.

5. The method of claim 1, further comprising:
   acquiring a third user identification of the first user, wherein a home area of the first user identification is different from a home area of the third user identification;
   determining, from the at least two distributed hosts, a second identification distributed host corresponding to the third user identification;
   sending a second identification update request to the second identification distributed host, wherein the second identification update request comprises the first identity identification and the third user identification, so that the second identification distributed host stores the first identity identification and the third user identification in an associated manner in response to the second identification update request; and
   sending a first identification deletion request to the first identification distributed host, wherein the first identification deletion request comprises the first user identification, so that the first identification distributed host deletes the stored first user identification and first identity identification in response to the first identification deletion request.

6. The method of claim 1, further comprising:
   sending a second identification deletion request to the first identification distributed host, wherein the second identification deletion request comprises the first user identification, so that the first identification distributed host deletes the stored first user identification and first identity identification in response to the second identification deletion request.

7. The method of claim 1, further comprising:
   sending a data update request to the first data distributed host, wherein the data update request comprises the first identity identification and second user data of the first user, and a user data type of the first user data is the same as a user data type of the second user data, so that the first data distributed host updates the first user data stored in association with the first identity identification to the second user data in response to the data update request.

8. The method of claim 1, further comprising:
sending a data deletion request to the first data distributed host, wherein the data deletion request comprises the first identity identification, so that the first data distributed host deletes the first user data stored in association with the first identity identification in response to the data deletion request.

9. The method of claim 1, further comprising:
acquiring a target user identification of a target user;
determining, from the at least two distributed hosts, a target identification distributed host corresponding to the target user identification;
sending the target user identification to the target identification distributed host, so that the target identification distributed host queries a target identity identification corresponding to the target user identification;
receiving the target identity identification sent by the target identification distributed host;
sending the target identity identification to the at least two distributed hosts respectively, so that the at least two distributed hosts query target user data stored in association with the target identity identification respectively; and
receiving the target user data sent by a distributed host obtaining the queried target user data.

10. The method of claim 3, further comprising:
acquiring a target user identification of a target user and a home area corresponding to target user data of the target user;
determining, from the at least two distributed hosts, a target identification distributed host corresponding to the target user identification and a target data distributed host corresponding to the home area corresponding to the target user data;
sending the target user identification to the target identification distributed host, so that the target identification distributed host queries a target identity identification corresponding to the target user identification;
receiving the target identity identification sent by the target identification distributed host;
sending the target identity identification to the target data distributed host, so that the target data distributed host queries target user data stored in association with the target identity identification;
receiving the target user data sent by the target data distributed host.

11. A data storage apparatus applied to a data storage device, comprising:
a processor; and
a memory for storing instructions executable by the processor;
wherein the processor is configured to:
acquire a first user identification and first user data of a first user;
determine, from at least two preset distributed hosts, a first identification distributed host corresponding to the first user identification and a first data distributed host corresponding to the first user data, wherein the first identification distributed host is the same as or different from the first data distributed host, and the at least two distributed hosts are located in different areas;
send the first user identification to the first identification distributed host, so that the first identification distributed host stores the first user identification, and generates and stores a first identity identification corresponding to the first user identification; and
receive the first identity identification sent by the first identification distributed host;
wherein the processor is further configured to send the first identity identification and the first user data to the first data distributed host, so that the first data distributed host stores the first identity identification and the first user data in an associated manner.

12. The apparatus of claim 11, wherein the processor is further configured to:
determine a home area corresponding to the first user identification based on the first user identification and a preset correspondence relationship between user identifications and home areas; and
determine, from areas where the at least two distributed hosts are located, a first target area that is the same as the home area corresponding to the first user identification, and take a distributed host corresponding to the first target area as the first identification distributed host.

13. The apparatus of claim 11, wherein the processor is further configured to:
determine a home area corresponding to the first user data based on a user data type of the first user data and a preset correspondence relationship between user data types and home areas; and
determine, from areas where the at least two distributed hosts are located, a second target area that is the same as the home area corresponding to the first user data, and take a distributed host corresponding to the second target area as the first data distributed host.

14. The apparatus of claim 11, wherein the processor is further configured to send a first identification update request to the first identification distributed host, wherein the first identification update request comprises the first user identification and a second user identification of the first user, and a home area of the first user identification is the same as a home area of the second user identification, so that the first identification distributed host updates the stored first user identification to the second user identification in response to the first identification update request.

15. The apparatus of claim 11, wherein the processor is further configured to acquire a third user identification of the first user, wherein a home area of the first user identification is different from a home area of the third user identification;
the processor is further configured to determine, from the at least two distributed hosts, a second identification distributed host corresponding to the third user identification;
the processor is further configured to send a second identification update request to the second identification distributed host, wherein the second identification update request comprises the first identity identification and the third user identification, so that the second identification distributed host stores the first identity identification and the third user identification in an associated manner in response to the second identification update request;
the processor is further configured to send a first identification deletion request to the first identification distributed host, wherein the first identification deletion request comprises the first user identification, so that the first identification distributed host deletes the stored first user identification and first identity identification in response to the first identification deletion request.

16. The apparatus of claim 11, wherein the processor is further configured to send a second identification deletion request to the first identification distributed host, wherein the second identification deletion request comprises the first user identification, so that the first identification distributed host deletes the stored first user identification and first identity identification in response to the second identification deletion request.

17. The apparatus of claim 11, wherein the processor is further configured to send a data update request to the first data distributed host, wherein the data update request comprises the first identity identification and second user data of the first user, and a user data type of the first user data is the same as a user data type of the second user data, so that the first data distributed host updates the first user data stored in association with the first identity identification to the second user data in response to the data update request.

18. The apparatus of claim 11, wherein the processor is further configured to send a data deletion request to the first data distributed host, wherein the data deletion request comprises the first identity identification, so that the first data distributed host deletes the first user data stored in association with the first identity identification in response to the data deletion request.

19. The apparatus of claim 11, wherein the processor is further configured to acquire a target user identification of a target user;
the processor is further configured to determine, from the at least two distributed hosts, a target identification distributed host corresponding to the target user identification;
the processor is further configured to send the target user identification to the target identification distributed host, so that the target identification distributed host queries a target identity identification corresponding to the target user identification;
the processor is further configured to receive the target identity identification sent by the target identification distributed host;
the processor is further configured to send the target identity identification to the at least two distributed hosts respectively, so that the at least two distributed hosts query target user data stored in association with the target identity identifications respectively;
the processor is further configured to receive the target user data sent by a distributed host obtaining the queried target user data.

20. The apparatus of claim 13, wherein the processor is further configured to acquire a target user identification of a target user and a home area corresponding to target user data of the target user;
the processor is further configured to determine, from the at least two distributed hosts, a target identification distributed host corresponding to the target user identification and a target data distributed host corresponding to the home area corresponding to the target user data;
the processor is further configured to send the target user identification to the target identification distributed host, so that the target identification distributed host queries a target identity identification corresponding to the target user identification;
the processor is further configured to receive the target identity identification sent by the target identification distributed host;
the processor is further configured to send the target identity identification to the target data distributed host, so that the target data distributed host queries target user data stored in association with the target identity identification;
the processor is further configured to receive the target user data sent by the target data distributed host.

\* \* \* \* \*